United States Patent
Zurcher

(10) Patent No.: US 9,168,667 B2
(45) Date of Patent: Oct. 27, 2015

(54) HANDHELD POWER TOOL

(71) Applicant: FELCO MOTION SA, Les Geneveys-sur-Coffrane (CH)

(72) Inventor: Alain Zurcher, Pampigny (CH)

(73) Assignee: Felco Motion SA (CH)

( * ) Notice: Subject to any disclaimer, the term of this patent is extended or adjusted under 35 U.S.C. 154(b) by 0 days.

(21) Appl. No.: 14/400,849

(22) PCT Filed: Jul. 3, 2013

(86) PCT No.: PCT/EP2013/064039
§ 371 (c)(1),
(2) Date: Nov. 13, 2014

(87) PCT Pub. No.: WO2014/006095
PCT Pub. Date: Jan. 9, 2014

(65) Prior Publication Data
US 2015/0121706 A1    May 7, 2015

(30) Foreign Application Priority Data

Jul. 6, 2012 (EP) ................... 12005023

(51) Int. Cl.
*B26D 5/08* (2006.01)
*A01G 3/037* (2006.01)
*B26B 15/00* (2006.01)
*F16D 3/205* (2006.01)
*B23D 29/02* (2006.01)
(Continued)

(52) U.S. Cl.
CPC ........ *B26D 5/08* (2013.01); *A01G 3/037* (2013.01); *B23D 29/02* (2013.01); *B26B 15/00* (2013.01); *F16D 3/2052* (2013.01); *F16H 25/2021* (2013.01); *B23D 29/00* (2013.01)

(58) Field of Classification Search
CPC .......... B26D 5/08; B23D 29/02; B23D 29/00; F16H 25/2021; F16D 3/2052; B26B 15/00; A01G 3/037
USPC .......................................... 30/228
See application file for complete search history.

(56) References Cited

U.S. PATENT DOCUMENTS

| 1,553,312 | A |   | 9/1925  | Garrecht |
|-----------|---|---|---------|----------|
| 2,927,444 | A | * | 3/1960  | Wildhaber ............ 464/123 |
| 3,609,994 | A |   | 10/1971 | Colletti et al. |

(Continued)

FOREIGN PATENT DOCUMENTS

| DE | 8814543   | 1/1989 |
| EP | 2 213 426 | 8/2010 |

(Continued)

*Primary Examiner* — Sean Michalski
(74) *Attorney, Agent, or Firm* — Blank Rome LLP

(57) ABSTRACT

The invention relates to a handheld power tool (1), including: a mobile element (100) and a stationary element (102); a rotatable actuator; a ball nut (200); a ball screw (202) having a first end (202*a*) connected to the mobile element (100); and a universal joint (10, 12, 14) arranged so as to be driven by the rotatable actuator and so as to rotate the ball nut (200) on said ball screw (202) in order to move the ball screw (202), and thus the mobile element (100), relative to the stationary element (102). The universal joint can be advantageously retained inside two concentric spherical bearings (50*a*, 60*a*, 70*a*, 80*a*), thus making it possible to take up the axial forces in two directions. It is thus possible to eliminate any radial force on the ball screw (202) and have angularly variably rotational output.

15 Claims, 3 Drawing Sheets

(51) Int. Cl.
*F16H 25/20* (2006.01)
*B23D 29/00* (2006.01)

(56) References Cited

U.S. PATENT DOCUMENTS

| | | | | |
|---|---|---|---|---|
| 4,395,246 | A * | 7/1983 | Taig et al. | 464/153 |
| 5,816,926 | A * | 10/1998 | Lynch et al. | 464/114 |
| 7,354,348 | B2 * | 4/2008 | Kapustin et al. | 464/119 |
| 7,527,500 | B2 * | 5/2009 | Montena | 439/8 |
| 2008/0315040 | A1 * | 12/2008 | Moalic et al. | 244/220 |
| 2010/0192383 | A1 * | 8/2010 | Ishiguro | 30/228 |
| 2011/0185579 | A1 * | 8/2011 | Pellenc | 30/228 |
| 2011/0229254 | A1 * | 9/2011 | Su | 403/114 |
| 2012/0011729 | A1 * | 1/2012 | Kim et al. | 30/228 |
| 2012/0143195 | A1 * | 6/2012 | Sander | 606/80 |
| 2014/0157522 | A1 * | 6/2014 | Lorini | 7/107 |
| 2014/0165411 | A1 * | 6/2014 | Binder | 30/228 |
| 2015/0096397 | A1 * | 4/2015 | Jeng et al. | 74/424.82 |
| 2015/0113810 | A1 * | 4/2015 | Zurcher | 30/228 |
| 2015/0121706 | A1 * | 5/2015 | Zurcher | 30/228 |

FOREIGN PATENT DOCUMENTS

| | | |
|---|---|---|
| EP | 2 266 388 | 12/2010 |
| EP | 2 322 030 | 5/2011 |
| FR | 846943 | 9/1939 |
| FR | 2624417 | 6/1989 |
| JP | 2010/173045 | 8/2010 |
| WO | WO/2007/059544 | 5/2007 |

* cited by examiner

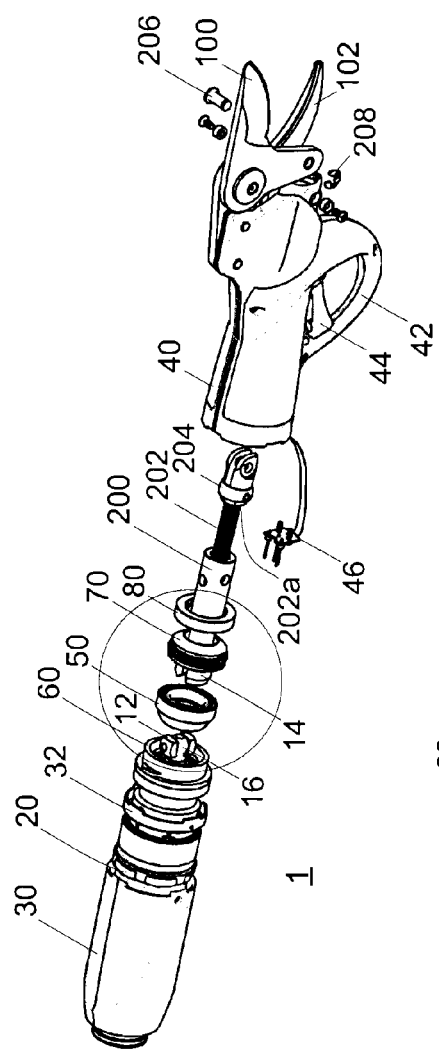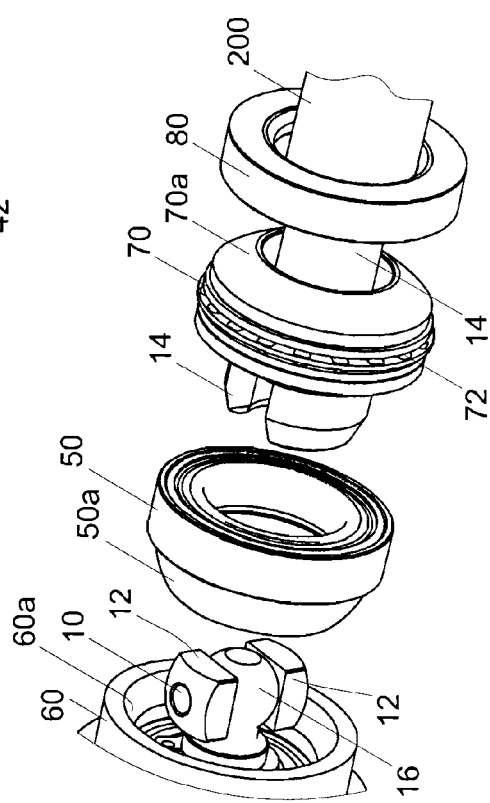

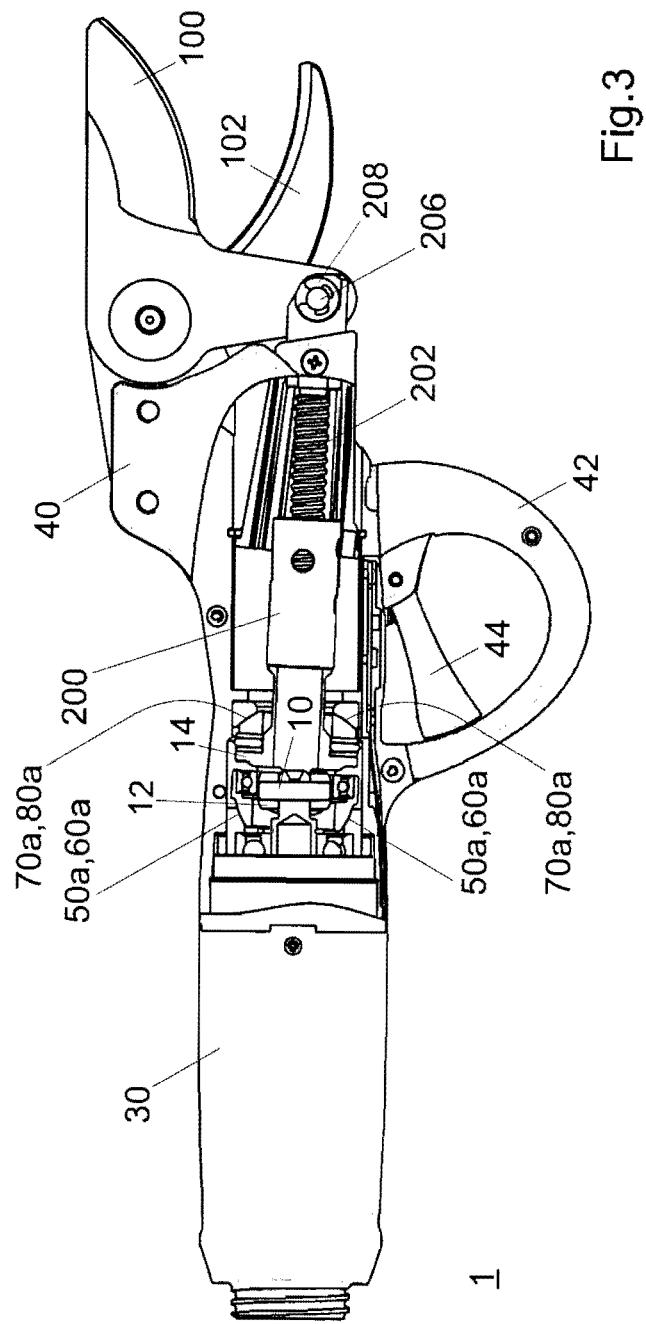

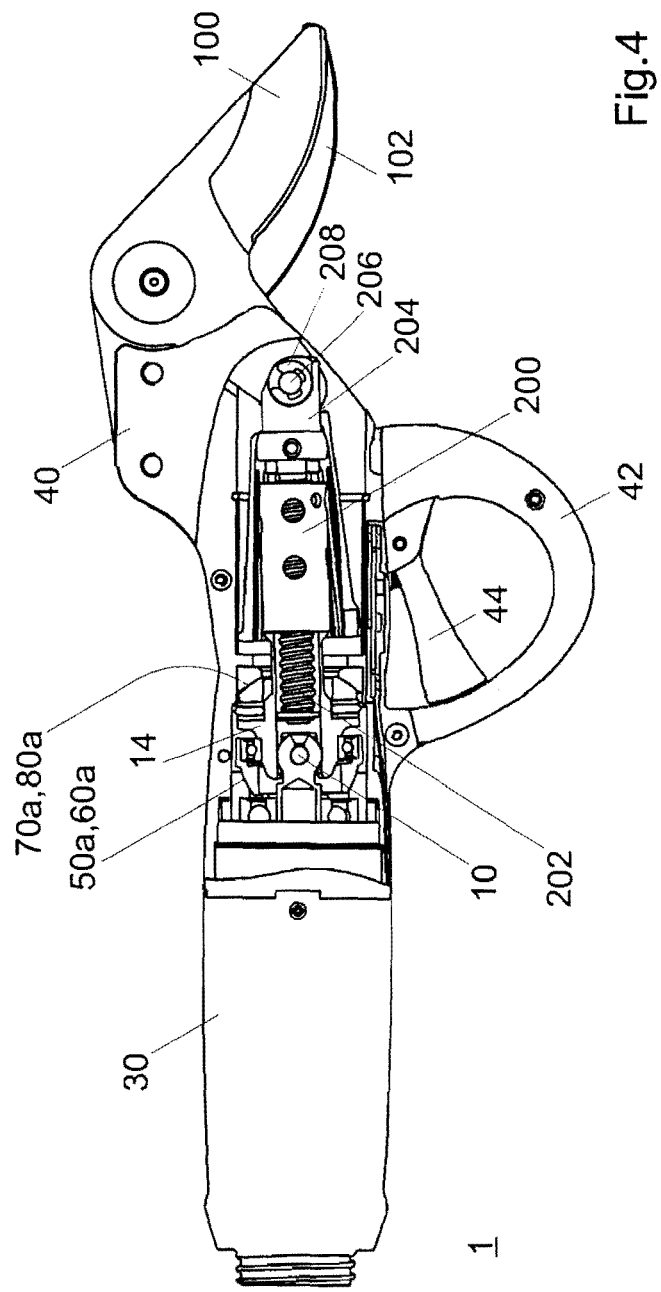

HANDHELD POWER TOOL

RELATED CASES

The present application is a national stage applica o of PCT/EP2013/064039, filed Jul. 3, 2013, which claims priority to European Patent Application No. EP2682238, tiled Jul. 6. 2012. The content of those applications arc hereby incorporated by reference

TECHNICAL FIELD

The present invention relates to a handheld power tool and particularly, but not exclusively, a handheld power tool with an electric actuator fed by one or more batteries for actuating a blade, a knife or another element that is movable with respect to another movable or fixed element, for example a counter blade or a counter knife.

PRIOR ART

A number of examples of portable tools of the pruning shear or shears type equipped with an electric, hydraulic or pneumatic actuator thus making it possible to reduce the effort of operators are known in the art. These tools are used particularly in the field of agriculture or viticulture, for example for cutting operations. The same principle, that is to say the integration of an electric, pneumatic or hydraulic actuator in a portable tool, is also used in shears, crimping pliers, presses, and many other tools used in a number of industrial activities.

The availability of electrochemical accumulators that are light and efficient has recently favored the development of autonomous electrically actuated tools, which are lighter and quicker than corresponding tools actuated pneumatically or hydraulically. The linear electric actuators contained in these tools are more delicate, however, than pneumatic jacks and have to be protected from the infiltration of dust, foreign bodies and liquids, in particular in the field of agriculture, when the cutting operations are combined with spraying treatments or are performed in winter.

The development of batteries and actuators that are more efficient and compact has additionally allowed the production of tools that are increasingly powerful, which are used to generate very substantial mechanical forces. These forces, particularly when they are radial forces, can reduce the reliability and longevity of the actuator.

In the majority of handheld electric pruning shears with linear movement, the actuator functions either via traction during the course of work of the tool by acting directly on the movable blade, or by means of an auxiliary lever system. Taking into account the need to limit the dimensions of the tool, the transmission of the force in the known tools is rarely optimal.

The known systems use one or more connecting rods to transmit the forces in a handheld power tool, such as an electric pruning shear. For example, EP2322030 (Lunatone) describes an electric pruning shear in which the movable blade is driven by a connecting rod connected at two interchangeable points to the movable blade. JP2010173045 and EP2213426 (Max Co) concern a motor-driven pruning shear, in which a nut advances along a threaded screw and drives a system of four connecting rods connected to the movable blade. WO07059544 (Strube K.), FR2624417 (Pellenc), EP2266388 (Lunatone) and DE8814543U describe pruning shears comprising a threaded rod connected by a connecting rod or link to the movable blade of the pruning shear.

The presence of one or more connecting rods in a handheld power tool is detrimental to its longevity: in fact, these connecting rods are subject to bending forces, that is to say to radial forces, which can break them, thus rendering the handheld power tool useless.

There is thus a need for a handheld power tool in which the disadvantages of the prior art are reduced or eliminated.

BRIEF SUMMARY OF THE INVENTION

One object of the present invention is to propose a handheld power tool exempt from the limitations of known handheld power tools.

A further object of the invention is to propose a handheld power tool having a longer service life than that of known handheld power tools.

In accordance with the invention, these objects are achieved in particular by means of a handheld power tool according to claim 1 and by means of a method for transmitting forces in a handheld power tool according to claim 15.

The handheld power tool according to the invention comprises:
- a movable element and a fixed element
- a rotatable actuator having a first axis of rotation
- a ball nut having a second axis of rotation
- a ball screw having a first end connected to the movable element
- a universal joint configured to be driven by the rotatable actuator and to rotate the ball nut on the ball screw so as to move the ball screw and thus the movable element relative to the fixed element.

In the tool according to the invention, the ball screw does not turn, because it has a first end connected to the movable element, for example a movable blade. The connection can be made for example with the aid of a fork or any other equivalent means. The universal joint is driven by the rotatable actuator, for example an electric actuator comprising a motor or geared motor group and rotates the ball nut on the ball screw: the ball nut thus turns on itself without moving axially. Its rotation advances the ball screw, which in turn drives the movable element, for example a movable blade, relative to the fixed element.

In other words, the ball nut is solely rotatable, the ball screw is fixed against rotation and is moved solely in the axial direction, that is to say the direction corresponding to that of the length of the handheld power tool during the rotation of the ball nut.

The universal joint in the context of this invention is thus used to rotate the ball nut on the ball screw so as to transmit a linear force to the ball screw. In other words, the ball screw thus works solely via traction or via compression.

In a preferred variant, the universal joint is formed by a shaft and two lugs inserted in the ends of the shaft. The shaft is inserted in a support element cooperating with a geared motor or directly with the motor. The lugs rotate a fork connected to the ball nut.

The universal joint can advantageously be held itself within a first and a second concentric linkage of the ball type having different or identical radii, making it possible to take up bidirectional axial forces. In the context of this invention, the expression "linkage of the ball type" denotes a contact between two spherical surfaces. In this context, the spherical surfaces define spherical bearings.

In other words, the universal joint can be advantageously held within two concentric spherical bearings, making it possible to take up bidirectional axial forces. It is thus possible to eliminate all radial force on the ball screw and to achieve an angularly variable rotational output.

In particular, a first support ring, convex, has a spherical outer surface that adapts precisely to the inner spherical surface of a second support ring, which is concave and which is connected to the body of the tool. The two spherical surfaces enable the transmission of the axial force generated by the rotatable actuator with a ball nut and constituting a first linkage of the ball type.

A third support ring, which is convex, also comprises an outer spherical surface, which is concentric with the spherical surface of the first support ring. This spherical surface adapts to a complementary spherical surface of a fourth ring, forming a second linkage therewith of the ball type, which is concentric with the first linkage.

The system composed of the universal joint and the double linkage of the ball type allows an angularly variable rotational output. In fact, there is a position of the ball screw in which, for example, the first axis of rotation of the rotatable actuator and the second axis of rotation of the ball nut are aligned.

In the handheld power tool according to the invention, the bail screw actuating the movable element, for example a movable blade, thus is not subject to any bending moment. Thus, in the handheld power tool according to the invention, any radial force on the ball screw is eliminated, which makes it possible to improve the service life of the tool compared with the known solutions.

In addition, the handheld power tool according to the invention has a reduced diameter compared with the known handheld power tools, since it has no connecting rod or system of connecting rods for transmitting forces, the movements of which rods requires space in the tool, which is thus larger than the tool according to the invention. The reduction of the diameter of the tool thus makes it possible to provide a handheld power tool that can be more easily handled by the user and that is also lighter.

The presence of a universal joint in a concentric double linkage of the ball type thus makes it possible on the one hand to take up the forces of the rotatable actuator and on the other hand to achieve an angularly variable output. The forces of the rotatable actuator are advantageously taken up in the proximity of the hand of the user: the distance between the point where the forces are taken up, that is to say the pivot point of the universal joint, and the movable blade allows an improved decomposition of the forces compared with the known solutions.

In a preferred variant, the universal joint according to the invention is also a constant-velocity joint, that is to say it rotates the ball nut on the ball screw at the same speed by which it is driven by the rotatable actuator.

In this variant, the join between the movable element and the ball screw includes a scraper sleeve that prevents foreign bodies, dust or drops of liquid from penetrating the handheld power tool from the front to the rear of the tool.

In the context of the invention, the terms "anterior", "front" or "distal" are used to denote the end of the tool normally furthest from the user, whereas the terms "posterior", "rear" and "proximal" are used to indicate the end of the tool closest to the user with normal use. The front end generally comprises the active elements of the tool, for example blades, whereas the rear end is equipped with a handle allowing the user to grasp the tool.

The body of the handheld power tool and the scraper sleeve delimit a protected volume that shelters the ball screw and the ball nut and preferably also the electric motor and any electronic unit present in the cover of the handheld power tool.

The scraper sleeve can be made of a high-performance polymer having the required mechanical characteristics, having a low coefficient of friction and preferably self-lubricating. Materials suitable for this application include, for example, Teflon® (PTFE), polyethylene (PE), polyethylene terephthalate (PET), polyethylene terephthalate polyester (PETP), polyamide, or Delrin0 (POM). This list is not exhaustive. The scraper sleeve could, however, also be made of metal, for example brass. The scraper sleeve may be a part that is susceptible to wear and that is to be replaced as necessary and may have a lip on its anterior edge so as to clean the inner surface of the body of the tool of any dirt that could deposit there.

In accordance with one aspect of the invention, the double linkage of the ball type thus has the advantage of preventing any transmission of radial forces to the ball screw. The radial forces are transmitted by the scraper sleeve to the body of the tool. The loop of forces thus obtained is very compact and the lateral rigidity is excellent. At the same time, the ball screw and the ball nut do not have to withstand any radial force or bending force, whatever the position of the movable element, which increases the efficacy of transmission and the reliability of the assembly.

In another variant, the protected volume delimited by the body of the handheld power tool and the scraper sleeve houses a system for positioning the movable element, for example one or more permanent magnets, with respect to one or more position sensors, for example Hall-effect sensors, magneto-resistive sensors, etc.

A magnet support comprising for example one or more magnets can be mounted on the ball nut and/or on the ball screw. The magnets can be the same size and can have the same polarity. These magnets can interact with one or more position sensors placed on an integrated circuit housed in the body of the handheld power tool so as to measure the rotation of the ball nut and/or the position of the ball screw in order to link the number of motor revolutions performed and the rotation of the ball nut/the position of the ball screw in the case where a technology without sensors is used to count the number of revolutions performed by the motor.

These aspects of the invention can be combined depending on the circumstances, as will be seen hereinafter.

The invention also relates to a method for transmitting forces in a handheld power tool comprising a movable element and a fixed element, this method comprising the following steps:
 driving a universal joint by a rotatable actuator
 rotating a ball nut on a ball screw via this universal joint, the ball screw having an end connected to the movable element
 moving the ball screw and thus the movable element relative to the fixed element.

BRIEF DESCRIPTION OF THE FIGURES

Exemplary implementations of the invention are indicated in the description illustrated by the accompanying figures, in which:

FIG. 1 illustrates a partially exploded view of an embodiment of the handheld power tool according to the invention.

FIG. 2 illustrates part of the handheld power tool according to the invention, in particular an embodiment of its universal joint.

FIG. 3 illustrates a sectional view of an embodiment of the handheld power tool according to the invention (configuration with open blades).

FIG. 4 illustrates a sectional view of an embodiment of the handheld power tool according to the invention (configuration with closed blades).

EXEMPLARY EMBODIMENT(S) OF THE INVENTION

In the following description provided by way of example, reference will be made, for reasons of simplicity, to a handheld electric pruning shear. However, the invention is not limited to such a tool. The invention also is not limited to agriculture, but also includes, for example, shears, pincers, presses, etc. for industrial and medical applications and for applications in any other field.

FIG. 1 illustrates a partially exploded view of an embodiment of the handheld power tool 1 according to the invention, which, in the example, is an electric pruning shear. This pruning shear comprises, in its rear portion, a cover 30 connected to the front portion of the pruning shear, formed by a shell 40 made of metal, for example aluminum. Two outer plastic shells can cover the shell 40. The metal shell 40 supports a rotatable actuator (not shown), which is housed in the rear cover 30 and which is blocked thanks to a fixing sleeve 20 and a fixing ring 32. One or more joints, for example O-ring joints, can also be used at the connection between the front portion and the rear portion of the pruning shear.

The fixing sleeve 20 can be inserted above the rotatable actuator in order to ensure the mechanical holding of the actuator with respect to the cover 30.

The rotatable actuator can be a linear electric actuator comprising a geared motor group. The gearing for example comprises an annular gear and planet gears (not illustrated).

The handheld power tool according to the invention comprises a ball nut 200 and a ball screw 202 in the nut 200 and having a first end 202a connected to the movable blade 100. In the illustrated example, the connection between the ball screw 202 and the movable blade is formed with the aid of a fork 204, which cooperates with a first fixing element 206, for example a pivot, and a second fixing element, for example a circlip 208.

In accordance with the invention, a universal joint, visible in the circle of FIG. 1 and in FIG. 2, is configured to be driven by the rotatable actuator and to rotate the ball nut 200 on the ball screw 202 so as to move the ball screw 202 and thus the movable element 100 relative to the fixed element 102.

As can be seen in FIGS. 3 and 4, which respectively show an embodiment of the handheld power tool according to the invention with the movable blade 100 in an open position and in a closed position with respect to the counter blade 102, the ball screw 202 does not turn, because it has the first end 202a connected to the movable blade 100. In FIGS. 3 and 4, the trigger has been shown in the same position for reasons of simplicity.

The universal joint is driven by the rotatable actuator and rotates the ball nut 200 on the ball screw 202: the ball nut thus turns on itself without moving. Its rotation advances the ball screw 202, which thus moves the movable blade 100 relative to the counter blade 102.

In other words, the ball nut 200 is movable solely in rotation, the ball screw 202 is fixed against rotation and is moved solely in the axial direction, that is to say the direction corresponding to that of the length of the handheld power tool during the rotation of the ball, nut 200. The ball screw 202 thus works solely via traction or via compression.

In the variant illustrated in the figures, in particular in FIG. 2, the universal joint is formed by a shaft 10 and two lugs 12, which are inserted in the ends of the shaft 10. The body of the shaft is inserted in a support element 16 cooperating with the geared motor or directly with the motor. The lugs 12 rotate a fork 14 connected to the ball nut 200, for example inserted in the ball nut 200.

Further embodiments of the universal joint can be conceived within the context of the invention, for example comprising two forks cooperating with one another with the aid of a connection part, for example in the form of a cross.

The universal joint illustrated in the figures is held within a first and a second concentric linkage of the ball type having different or identical radii, making it possible to take up bidirectional axial forces.

In particular, a first support ring 50, convex, has a spherical outer surface 50a that adapts precisely to the inner spherical surface of a second support ring 60, which is concave and which is connected to the body of the tool. The two spherical surfaces 50a, 60a enable the transmission of the axial force generated by the rotatable actuator having a ball nut 200 and constituting a first linkage of the ball type.

A third support ring 70, which is convex, also comprises an outer spherical surface 70a, which is concentric with the spherical surface 50a of the first support ring. This spherical surface adapts to a complementary spherical surface of a fourth ring 80, forming a second linkage therewith of the ball type 70a, 80a, visible in FIGS. 3 and 4, which is concentric with the first linkage 50a, 60a. The third support ring 70 may comprise bearings 72.

The system composed of the universal joint and the double linkage of the ball type allows an angularly variable rotational output. In the handheld power tool according to the invention, all radial force on the ball screw 202 is thus eliminated, which makes it possible to improve the service life of the tool compared with the known solutions.

The presence of a universal joint in a concentric double linkage of the ball type thus makes it possible on the one hand to take up the forces of the rotatable actuator and on the other hand to achieve an angularly variable output, as can be seen in FIGS. 3 and 4. The forces of the rotatable actuator are advantageously taken up in the proximity of the hand of the user: the distance between the point where the forces are taken up, that is to say the pivot point of the universal joint, and the movable blade 100 allows an improved decomposition of the forces compared with the known solutions.

In a preferred variant, the universal joint according to the invention is also a constant-velocity joint, that is to say it rotates the ball nut 200 on the ball screw 202 at the same speed by which it is driven by the rotatable actuator.

In a further variant, the junction movable element-ball screw includes a scraper sleeve (not illustrated) that prevents foreign bodies, dust or drops of liquid from penetrating the handheld power tool from the front to the rear of the tool.

The scraper sleeve can be made of a high-performance polymer having the required mechanical characteristics, having a low coefficient of friction and preferably self-lubricating. Materials suitable for this application include, for example, Teflon® (PTFE), polyethylene (PE), polyethylene terephthalate (PET), polyethylene terephthalate polyester (PETP), polyamide, or Delrin® (POM). This list is not exhaustive. The scraper sleeve could, however, also be made of metal, for example brass. The scraper sleeve may be a part that is susceptible to wear and that is to be replaced as necessary and may have a lip on its anterior edge so as to clean the inner surface of the body of the tool of any dirt that could deposit there.

In another variant, the protected volume delimited by the body of the handheld power tool and the scraper sleeve houses a system for positioning the movable element, for example one or more permanent magnets, with respect to one or more position sensors, for example Hall-effect sensors, magneto-resistive sensors, etc.

A magnet support comprising, for example, one or more magnets can be mounted on the ball nut and/or on the ball screw. The magnets can be the same size and can have the same polarity. These magnets can interact with one or more position sensors placed on an integrated circuit 46 housed in the body of the handheld power tool so as to measure the rotation of the ball nut and/or the position of the ball screw in order to link the number of motor revolutions performed and the rotation of the ball nut/the position of the ball screw in the case where a technology without sensors is used to count the number of revolutions performed by the motor.

REFERENCE NUMBERS USED IN THE FIGURES 1 handheld power tool
10 shaft
12 lug
14 fork
16 support element
20 fixing sleeve
30 rear cover
32 fixing ring
40 front shell
42 guard
44 trigger
46 integrated circuit
50 first support ring
50a outer spherical surface of the first support ring
60 second support ring
60a inner spherical surface of the second support ring
70 third support ring
70a outer spherical surface of the third support ring
72 bearing of the third support ring
80 fourth support ring
80a inner spherical surface of the fourth support ring
100 movable element
102 fixed element
200 ball nut
202 ball screw
202a end of the ball screw connected to the movable element
204 connection element ball screw-movable element
206 first fixing element
208 second fixing element

The invention claimed is:

1. A handheld power tool comprising
a movable element and a fixed element
a rotatable actuator having a first axis of rotation
a ball nut having a second axis of rotation
a ball screw having a first end connected to the movable element
universal joint configured to be driven by said rotatable actuator and to rotate the ball nut on the ball screw so as to move said ball screw and thus said movable element relative to said fixed element.

2. The handheld power tool as claimed in claim 1, comprising two spherical bearings, said universal join being configured to be inserted between said spherical bearings.

3. The handheld power tool as claimed in claim 1, said universal joint comprising a shaft, two lugs, and a fork connected to the ball nut.

4. The handheld power tool as claimed in claim 3, said shaft comprising a body and two ends, the body of said shall being configured to be inserted in a support element cooperating with said rotatable actuator said lugs being configured to be inserted in the ends of the shaft and to rotate said fork.

5. The handheld power tool as claimed in claim 1, comprising a first linkage of the ball type.

6. The handheld power tool as claimed in claim 1, comprising a second linkage of the ball type.

7. The handheld power tool as claimed in claim 6, said second linkage of the ball type being concentric with said first linkage of the ball type.

8. The handheld power tool as claimed in claim 1, comprising a scraper sleeve.

9. The handheld power tool as claimed in claim 1, comprising a system for positioning the movable element.

10. The handheld power tool as claimed claim 1, said ball nut being solely rotatable, said hall screw being fixed against rotation and being moved solely in the axial direction during the rotation of the ball nut.

11. The handheld power tool as claimed in claim 1, said first end of said hall screw being connected to the movable element directly or via a junction piece, such as a fork.

12. The handheld power tool as claimed in claim 1, said rotatable actuator being a linear electric actuator comprising a geared motor group acting on said universal joint, which rotates said ball nut, which drives said ball screw in translation.

13. The handheld power tool as claimed in claim 1, said universal joint being a constant-velocity joint.

14. The handheld power tool as claimed in claim 1, forming a pruning shear or shears.

15. A method for transmitting forces in a handheld power tool comprising a movable element and a fixed element, said method comprising the followings steps:
driving a universal joint by a rotatable actuator
rotating a ball nut on a ball screw via said universal joint inserted in two spherical bearings, said ball screw having an end connected to said movable element
moving said ball screw and thus said movable element relative to said fixed element.

* * * * *